United States Patent [19]
Feuillade et al.

[11] 3,985,574
[45] Oct. 12, 1976

[54] ELECTROCHEMICAL ELEMENTS IN THIN LAYERS

[75] Inventors: Georges Feuillade, Arpajon; Bernard Chenaux, Paris; Philippe Perche, Bures-sur-Yvette, all of France

[73] Assignee: Compagnie Generale d'Electricite, Paris Cedex, France

[22] Filed: July 24, 1975

[21] Appl. No.: 598,917

Related U.S. Application Data
[62] Division of Ser. No. 466,339, May 2, 1974.

[30] Foreign Application Priority Data
May 18, 1973  France ............................. 73.18171
Sept. 21, 1973  France ............................. 73.33972

[52] U.S. Cl. ............................. 429/162; 429/190
[51] Int. Cl.² ............................. H01M 35/00
[58] Field of Search ............ 136/111, 108, 109, 6 R, 136/20, 23, 100 R, 157, 158, 175, 146

[56] References Cited
UNITED STATES PATENTS
2,865,976  12/1958  Jammet ............................. 136/111
2,903,498  9/1959  Sindel et al. ............................. 136/95
3,004,093  10/1961  Richter et al. ............................. 136/175
3,563,805  2/1971  Deierhoi, Jr. ............................. 136/111

*Primary Examiner*—Anthony Skapars
*Attorney, Agent, or Firm*—Sughrue, Rothwell, Mion, Zinn and Macpeak

[57] ABSTRACT

Electrochemical elements in thin layers comprising a stack of thin layers, successively a cooper layer, a catholyte, a separator, a lithium layer, the catholyte and the separator being formed by a gel comprising more particularly formal or polyvinylic butyral, reticulated or otherwise and impregnated with a solvent such as propylene carbonate or N-methyl-pyrrolidone saturated with an ionically conductive salt such as ammonium perchlorate. A variant consists in forming the separator with a gel of reticulated polymer basically containing polyvinylidene fluoride and a mineral charge such as magnesia.

22 Claims, 1 Drawing Figure

U.S. Patent  Oct 12, 1976  3,985,574
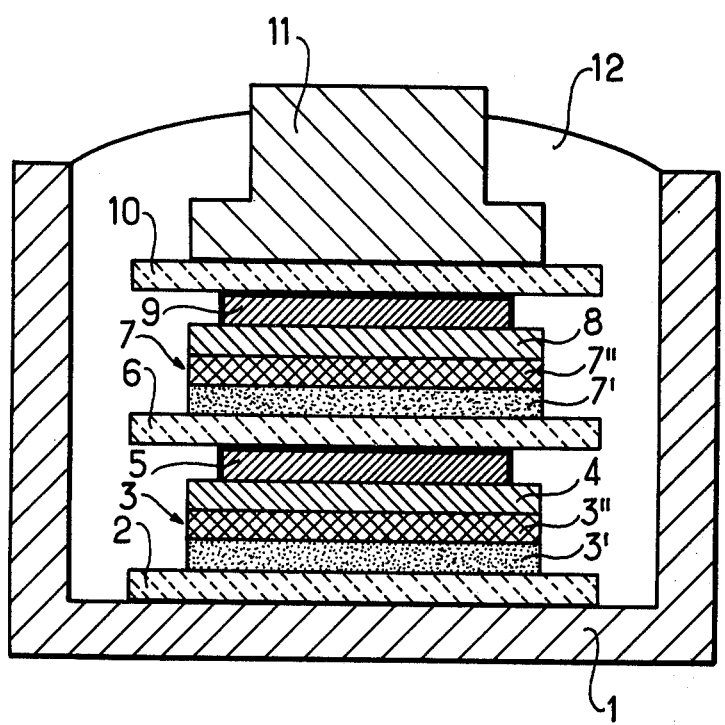

ELECTROCHEMICAL ELEMENTS IN THIN LAYERS

This is a division of application Ser. No. 466,339, filed May 2, 1974.

The present invention concerns electrochemical elements in thin layers as well as a method for preparing the said elements. It also concerns storage batteries consisting of one or several of the said elements.

Elements constituted mainly by a stack of thin solid layers arranged, in the charged state, according to the following sequence are known;

A cathode collector formed by a substance which is a good electronic conductor;

A catholyte comprising a substance such as cupric sulphide suitable for providing anions capable of forming, with the substance of the anode, a discharge product;

A separator impermeable to the catholyte and comprising an ionic conductor salt;

A lithium anode.

The aim of the present invention is to form elements having a high power to weight ratio and efficiency on discharging, capable, moreover, of constituting batteries for which numerous practical applications may be found.

The invention therefore has for its object an electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator impermeable to the said catholyte and a fourth thin anode layer comprising lithium, characterized in that the said catholyte as well as the said separator comprise at least partly a gel formed by at least a polyvinylic acetal impregnated with at least a solvent and at least an ionically conductive salt.

The invention concerns also an electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator which is impermeable to the said catholyte and a fourth thin anode layer comprising lithium, characterized in that the said catholyte, as well as the said separator comprise at least partly a gel impregnated with at least a solvent as well as with at least an ionically conductive salt, the gel forming the said catholyte comprising at least a polyvinylic acetal the gel forming the said separator comprising at least a polymer as well as a mineral charge.

It concerns also a method for producing an electrochemical element as well as storage batteries comprising one or several of the said elements in series.

The following text will describe a few examples of embodiment of electrochemical elements in thin layers, according to the invention, these examples being given only by way of illustration and having no limiting character, with reference to the accompanying figure.

In all cases, the cathode collector is formed by a thin metallic layer such as copper and the anode is formed by a thin layer of lithium.

Inasmuch as concerns the catholyte, the latter is formed by a cupric sulphide powder CuS agglomerated by a gel consisting of a resin such as polyvinylic formal (designated hereinafter by the letters PVF) and of a solvent such as propylene carbonate (designated hereinafter by the letters PC) saturated with a conductive salt such as ammonium perchlorate $ClO_4Am$.

Such a gel is prepared by mixing the various ingredients mentioned above in the following proportions by weight:

$$\frac{5}{100} < \frac{PVF}{PC} < \frac{15}{100}, \quad \frac{50}{50} < \frac{CuS}{PVF+PC+ClO_4Am} < \frac{90}{10}$$

Preferably, these values are (10/100) and (70/30) respectively.

Such a gel, which has a weak consistency, is pasted onto a substrate consisting of a silver or tin-plated or silver-plated silver or copper foil on which a grid forming a honeycomb support is welded by thermocompression. The said gel is therefore pasted on so as to pack the alveoli of the grid, then the excess gel overflowing from the said grid is scraped off.

It must be understood that the thickness of the grid and the dimensions of the alveoli are predetermined as a function of the required capacity of the element.

It is also possible to produce the catholyte as set forth above, but replacing the PVF by polyvinylic butyral (designated hereinafter by PVB) and replacing the PC by N-methyl-pyrrolidone (referenced N.M.P.)

Such a gel could possibly be non-reticulated or reticulated in the manner which will be described in the case of the separator.

A few examples of embodiments of separators will now be described, the catholyte having a composition substantially identical to those previously described.

It should be mentioned that the separator is formed by a polyvinylic acetal, more particularly PVF or PVB and a solvent saturated with a conductive salt such as $ClO_4Am$.

Jointly with the PVF, the solvent generally used is PC.

Jointly with the PVB, the solvent generally used is N.M.P.

A gel which, according to the relative proportions of acetal and of solvent, has variable viscosities, is thus obtained.

Such a gel could be either reticulated or non-reticulated and, in this latter case, the reticulation agent could be either directly incorporated with the ingredients forming the gel or incorporated with the gel after the forming thereof using the said ingredients.

1ST EXAMPLE.

PVF and PC are mixed in proportions by weight such that:

$$\frac{5}{100} < \frac{PVF}{PC} < \frac{15}{100} \quad \text{and preferably equal to} \quad \frac{10}{100}$$

and preferably equal to 10/100
the PC being saturated with $ClO_4Am$.

A soft gel which is not very resistant, is run after a slight heating on to a porous support such as asbestos so as to impregnate it.

The separator thus produced has excellent electrical conductivity and promotes good discharging of the element. Applications which are a particularly advantage are found for it in single-cell batteries. It should be observed that it is possible to use, instead of $ClO_4Am$ (as, moreover, in the following examples) other salts, such as lithium perchlorate, potassium iodide or sodium fluoroborate. Such a detail applies also to the case of the catholyte.

2ND EXAMPLE.

PVF and PC are mixed in proportions by weight such that:

$$\frac{20}{100} < \frac{PVF}{PC} < \frac{40}{100} \quad \text{and preferably equal to} \quad \frac{30}{100}$$

and preferably equal to 30/100

The PC being saturated with $ClO_4Am$.

A gel having the consistency of indiarubber which is put into form either by hot casting on a support plate so as to form a thin film, or by casting or pressing on an insulating woven fabric such as nylon.

The separator thus obtained has a high melting point, in the order of 70° to 120° according to its composition.

A variant consists in substituting about 50% of the PVF by bentone.

This product is an organophilic bentonite whose alkaline cations have been substituted by quaternary ammonium.

A hard gel having excellent conductivity and offering opposition to the passivation of the element during discharge is obtained.

The two examples which have just been described concern separators formed by non-reticulated hard or soft gels.

Examples in which reticulated gels are used will now be described.

It should immediately be stated that such gels have excellent mechanical properties, as well as very good thermal resistance; they are to great advantage, used in batteries formed by several elements, in which the temperature may reach 70° C.

3RD EXAMPLE.

PVB comprising about 25% of non-acetalised residual OH is mixed with a solvent such as ethanol or tetrahydrofurane (designated by THF) and with a reticulation agent, in this case, epichlorhydrine or chloroepoxypropane (designated by the initials EPC, hereinafter) so as to form a fluid solution, the proportion of EPC being about 5 to 10% of the weight of the PVB.

To great advantage, a few drops of $H_2SO_4$, which catalyses the reaction, is added to the mixture.

It is run onto a plate and dried to remove the THF. The film obtained having a spongy consistency is soaked with NMP saturated with $ClO_4Am$. It is dried superficially to remove the excess NMP. Such a film has a resistance of 65 ohm/squ. cm. and an excellent mechanical reaction.

It is also possible, instead of running onto a plate, to impregnate a porous asbestos support.

4TH EXAMPLE.

PVF comprising about 5 to 6% of residual OH is mixed with THF as a solvent and with EPC as a reticulating agent, in $H_2SO_4$ in a proportion by weight substantially the same as previously.

It is run onto a plate, dried to remove the THF and the film obtained is impregnated with PC saturated with $ClO_4Am$. Drying is effected at ambient temperature, but that operation may be carried out at about 70° C during a few minutes in order to strengthen the reticulation.

Such a film has a resistance of about 100 ohms/squ. cm.

As in the preceding case, an asbestos support may be impregnated with that gel.

5TH EXAMPLE.

PVF and PC as a solvent saturated with $ClO_4Am$ and EPC as a reticulation agent are mixed together in the following proportions by weight;

$$\frac{10}{100} < \frac{PVC}{PC} < \frac{20}{100}$$

EPC : 5 to 10% of the weight of PVF.

The soft gel thus formed is rapidly injected or hot pressed on a woven nylon fabric. After cooling, a heat treatment is carried out at a temperature of 50° to 70° and during a period lasting from a few minutes to an hour to complete the reticulation and desolvatation required.

It might possibly be necessary to re-impregnate with PC saturated with $ClO_4Am$ if too great a quantity of solvent has been removed.

6TH EXAMPLE.

PVB comprising about 25% of residual OH is mixed with a solvent such as ethanol or THF so as to obtain a fluid mixture. It is run onto a plate so as to form a film which is dried.

In that case, reticulation is effected in several different ways

Either by dipping of the said film in a solution of EPC in NMP saturated with $ClO_4Am$;

Or by dipping the said film in a solution of isopropyl titanate in NMP saturated with $ClO_4Am$;

Or by dipping the said film in a solution of dimethylolurea in NMP saturated with $ClO_4Am$.

The film therefore contains NMP saturated with $ClO_4Am$.

7TH EXAMPLE.

PVF and THF are mixed together in proportions such that a fluid product is obtained.

This is run onto a plate so as to form a film which is dried to remove the THF and which is reticulted:

Either by dipping the said film in a solution of EPC in PC saturated with $ClO_4Am$;

Or by dipping of the said film in a solution of isopropyl titanate in NMP saturated with $ClO_4Am$.

A variant of the two preceding examples consists in forming a gel with PVF and PC (or PVB and NMP), in hot casting it on a plate and in reticulating it "in situ" by running onto the film thus formed a reticulation solution similar to those previously mentioned. Such a variant makes it possible to avoid the film drying phase and the consecutive re-impregnation and hence to operate more rapidly.

8TH EXAMPLE.

PVC and PC saturated with ClO$_4$Am are mixed together in a proportion PVC/PC close to $$\frac{20}{100} \text{ to } \frac{30}{100}$$

A relatively hard gel which is hot pressed or hot injected so as to form a film which may also be formed on a woven nylon fabric, is obtained.

The film is dried then dipped in a reticulation bath as previously mentioned.

9TH EXAMPLE.

A fluorinated macro-molecular compound such as the copolymer of vinylidene fluoride and of hexafluoropropylene, a reticulation agent such as N-N'-Dicinnamylidene-1.6-hexanediamine and magnesia are inserted in a solvent such as a not very volatile cetone, in this case, methyl-ethyl-ketone. The mixture is very thoroughly shaken to make it homogenous. In this way, a viscous gel which is run onto a glass plate so as to form a film or thin layer having, after drying, a thickness between 1 and 2/10 of a mmn, is obtained.

Drying is effected at ambient temperature in order to remove the solvent, then the film is heated in an oven the about 160° for 15 to 30 minutes to effect the reticulation of the polymer and remove all traces of solvent.

The thin film or layer is then impregnated with a saturated solution of ammonium perchlorate in PC by dipping during 4 to 5 hours. Lastly, the film thus impregnated is dried then installed in the electrochemical element.

Inasmuch as concerns the relative proportions of the various ingredients and of solvent, these proportions are such that a solution having a viscosity suitable for the running off is obtained.

By way of an example, the following proportions may be used: Copolymer of vinylidene fluoride and hexalfuoropropylene . . . 100 parts by weight

| Copolymer of vinylidene fluoride and hexalfuoropropylene | 100 parts by weight |
|---|---|
| Reticulation agent | 2 to 3 parts by weight |
| Magnesia | 15 parts by weight |

The assembly is inserted in 600 parts by weight of methylethylketone.

A variant of embodiment consists in using pure polyvinylidene fluoride.

Another variant consists in using as a reticulation agent an organic peroxyde and more particularly cinnamyle peroxyde.

In all cases, the proportions used are substantially the same as those shown in the preceding text.

Having thus described a few examples of embodiment of the catholyte and of the separator of an electrochemical element according to the invention the embodiment of a battery or cell comprising two elements connected up in series will now be illustrated with reference to the accompanying figure, it being understood that it is possible to form assemblies comprising a greater number of elements.

Thus, the accompanying figure shows a box 1 made, for example of stainless steel in which are successively stacked the following thin layers:

A copper sheet 2;
A catholyte 3 formed by its substrate 3' and by its grid 3'' impregnated with the gel containing Cus;
A separator 4;
A sheet of lithium 5;
A sheet of copper 6;
A catholyte 7 formed by its substrate 7' and by its grid 7'';
A separator 8;
A sheet of lithium 9;
A sheet of copper 10.

A pole member, 11, intended for constituting one pole of the battery, the other pole being the box 1, is arranged on the copper sheet 10.

It will be observed more particularly that the copper sheets 2, 6 and 10 have a diameter substantially greater than that of the other components with the aim of avoiding any possible arcing due to flow deformation of the separators and consequently the self-discharging of the circuit formed by the lithium and the cupric sulphide.

It will be observed also that the sheets of lithium 5 and 9 have a diameter less than that of the other components.

In the first case, a slight pressure is applied to the pale member 11 so that the height of the stack of the various layers be brought to a dimension equal to the sum of the thicknesses of the components.

The assembly is then brought to a temperature of 60°. Paraffin having a relatively low melting point, in the order of 55° is then poured into the box 1 and the assembly is transferred into a vacuum oven at about 60° to effect the degassing. After such a degassing, the assembly is removed from the oven, this having the effect of making the liquid paraffin enter all the interstices and of thus producing an effective coating shown at 12 in the figure. It must be understood that a lid crimped or fitted to the upper part of the box 1 could be used instead of the chock 11.

To give a clear idea, the box 1 has a diameter of 20mm, the copper sheets 2, 6 and 10 have a thickness of 5/100 mm, the catholyte 3 and 7 have a diameter of 18mm, the thickness of the substrates being 2/100mm and the thickness of the grid being a few tenths of a mm (a thickness of 1/10 of a mm corresponding to a capacity of 3 to 4 mAH/squ. cm) the separators 4 and 8 having a thickness comprised between 0.1 and 0.4 mm and the sheets of lithium 5 and 9 having a thickness of 0.2 mm for a diameter of 16 mm.

By way of an indication, the performances for storage batteries of 5 cells in series are substantially as follows; Electromotive force; 10 volts.

Efficiency at 70 to 80% of the theoretical output for a discharge of 5 $\mu$ A/Squ. cm.

It must be understood that the invention is in no way limited to the embodiments described and illustrated, but on the contrary, it covers all the variants thereof.

What is claimed is:

1. Electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator impermeable to the said catholyte and a fourth thin anode layer comprising lithium, characterized in that the said catholyte as well as the said separator comprise partly a gel formed by a polyvinylic acetal impregnated with at least a solvent and an ionically conductive salt.

2. Electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator which is impermeable to the said catholyte and a fourth thin anode layer comprising lithium, characterized in that the said catholyte, as well as the said separator comprise partly a gel impregnated with at least a solvent as well as with an ionically conductive salt, the gel forming the said catholyte comprising a polyvinylic acetal, the gel forming the said separator comprising a polymer as well as a mineral charge.

3. Element according to claim 1, characterized in that the said polyvinylic acetal is polyvinylic formal.

4. Element according to claim 1, characterized in that the said polyvinylic acetal is polyvinylic butyral.

5. Element according to claim 1, characterized in that the said solvent is propylene carbonate.

6. Element according to claim 1, characterized in that the said solvent is N-methylpyrrolidone.

7. Element according to claim 1, characterized in that the said ionically conductive salt is ammonium perchlorate.

8. Element according to claim 1, characterized in that the said ionically conductive salt is potassium iodide.

9. Element according to claim 1, characterized in that the said ionically conductive salt is sodium fluoborate.

10. Element according to claim 1, characterized in that the said ionically conductive salt is lithium perchlorate.

11. Element according to claim 1, characterized in that the said polymer is a copolymer of vinylidene fluoride and hexafluoropropylene.

12. Element according to claim 1, characterized in that the said polymer is vinylidene polyfluoride.

13. Element according to claim 1, characterized in that the said polyvinylic acetal is of the non-reticulated type.

14. Element according to claim 1, characterized in that the said polyvinylic acetal is of the reticulated type.

15. Element according to claim 14, characterized in that the reticulation agent of the said acetal is a solution of epichlorhydrine.

16. Element according to claim 14, characterized in that the reticulation agent of the said acetal is a solution of isopropyl titanate.

17. Element according to claim 14, characterized in that the reticulation agent of the said acetal is a solution of dimethylolurea.

18. Element according to claim 15, characterized in that the said reticulation agent is a solution in a solvent called a reticulation solvent, chosen from among the group constituted by ethanol, tetrahydrofurane, the said propylene carbonate and the said N-methyl-pyrrolidone and in a proportion of 5 to 10% by weight in relation to the weight of the polyvinylic acetal substantially.

19. Element according to claim 2, characterized in that the said polymer is of the reticulated type.

20. Element according to claim 19, characterized in that the said polymer is N-N' Dicinnamylidene-1.6-hexanediamine.

21. Element according to claim 19, characterized in that reticulation agent of the said polymer is an organic peroxyde.

22. Element according to claim 2, characterized in that the said mineral charge comprises magnesia.

* * * * *